(12) United States Patent
Kienke et al.

(10) Patent No.: US 8,388,068 B2
(45) Date of Patent: Mar. 5, 2013

(54) LOCKING AND RELEASING MECHANISM FOR VEHICLE SEAT

(75) Inventors: Ingo Kienke, Wermelskirchen (DE); James Abraham, Burscheid (DE); Prasad Andhavarapu Bhavani, N.S. Palaya (IN); Kirubaharan Reginold Albert, Burscheid (DE)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 13/307,240

(22) Filed: Nov. 30, 2011
(Under 37 CFR 1.47)

(65) Prior Publication Data

US 2012/0091776 A1 Apr. 19, 2012

Related U.S. Application Data

(60) Division of application No. 11/964,453, filed on Dec. 26, 2007, now Pat. No. 8,070,231, which is a continuation of application No. PCT/EP2006/006166, filed on Jun. 27, 2006.

(30) Foreign Application Priority Data

Jun. 27, 2005 (DE) .......................... 10 2005 030 050
Aug. 8, 2005 (DE) .......................... 10 2005 037 832

(51) Int. Cl.
*B60N 2/235* (2006.01)
(52) U.S. Cl. .................................................. 297/367 R
(58) Field of Classification Search .................. 297/369, 297/367 R, 366, 368, 216.13, 216.14
See application file for complete search history.

(56) References Cited

U.S. PATENT DOCUMENTS

| | | | |
|---|---|---|---|
| 3,779,655 A | 12/1973 | Toyota | |
| 4,314,729 A | 2/1982 | Klueting | |
| 6,644,746 B2 | 11/2003 | Bruck et al. | |
| 7,604,297 B2 | 10/2009 | Weber | |
| 2002/0089224 A1 | 7/2002 | Bruck et al. | |
| 2004/0189072 A1* | 9/2004 | Chiu et al. | ..... 297/367 |
| 2006/0181131 A1 | 8/2006 | Kienke et al. | |
| 2008/0122281 A1 | 5/2008 | Weber | |

FOREIGN PATENT DOCUMENTS

| | | |
|---|---|---|
| DE | 196 54 395 C1 | 2/1998 |
| DE | 196 33 782 C1 | 3/1998 |
| DE | 103 12 140 A1 | 10/2004 |
| JP | 11-113666 | 4/1999 |
| WO | WO-2004/082983 A1 | 9/2004 |

OTHER PUBLICATIONS

International Search Report dated Dec. 14, 2006 as received in corresponding PCT Application No. PCT/EP2006/006166, 4 pages.
US Notice of Allowance dated Jul. 27, 2011 as received in corresponding U.S. Appl. No. 11/964,453.
US Office Action dated Mar. 15, 2011 as received in corresponding U.S. Appl. No. 11/964,453.
US Office Action dated Sep. 24, 2010 as received in corresponding U.S. Appl. No. 11/964,453.

* cited by examiner

*Primary Examiner* — Milton Nelson, Jr.
(74) *Attorney, Agent, or Firm* — Foley & Lardner LLP

(57) ABSTRACT

A locking and releasing mechanism for a seat having a first fitting part associated with one of a seat part and a backrest and a second fitting part associated with the other one of the seat part and the backrest that may be locked and released relative to one another by the mechanism is disclosed. The mechanism includes a detent pawl configured to selectively latch the first fitting part to lock a displacement of the first and second fitting parts relative to one another and a detent plate configured to be reversibly displaced between a detent position, wherein the detent plate locks the detent pawl so that the detent pawl remains latched with the first fitting part, and a release position, wherein the detent plate allows the detent pawl to be released from the first fitting part.

5 Claims, 15 Drawing Sheets

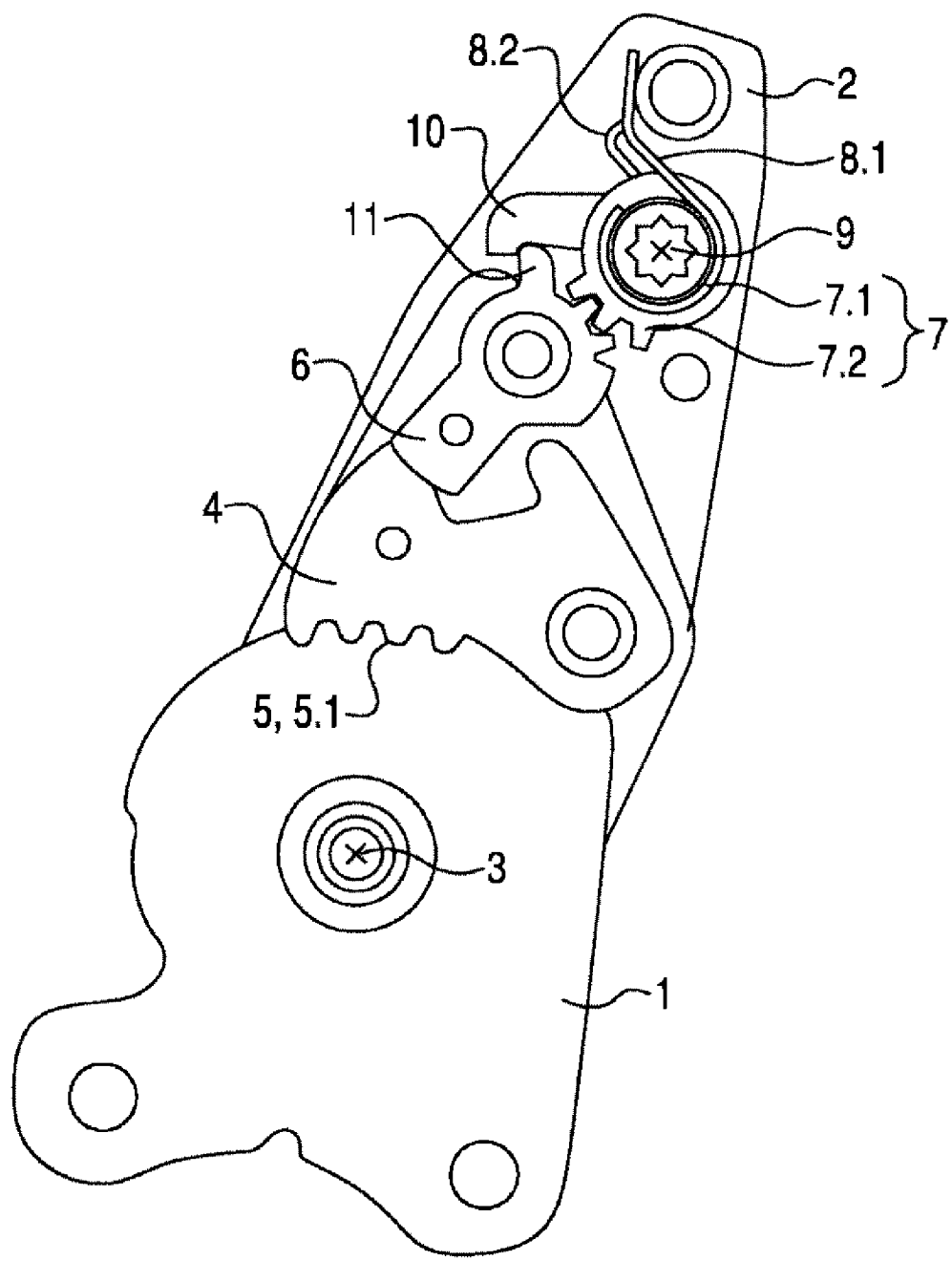

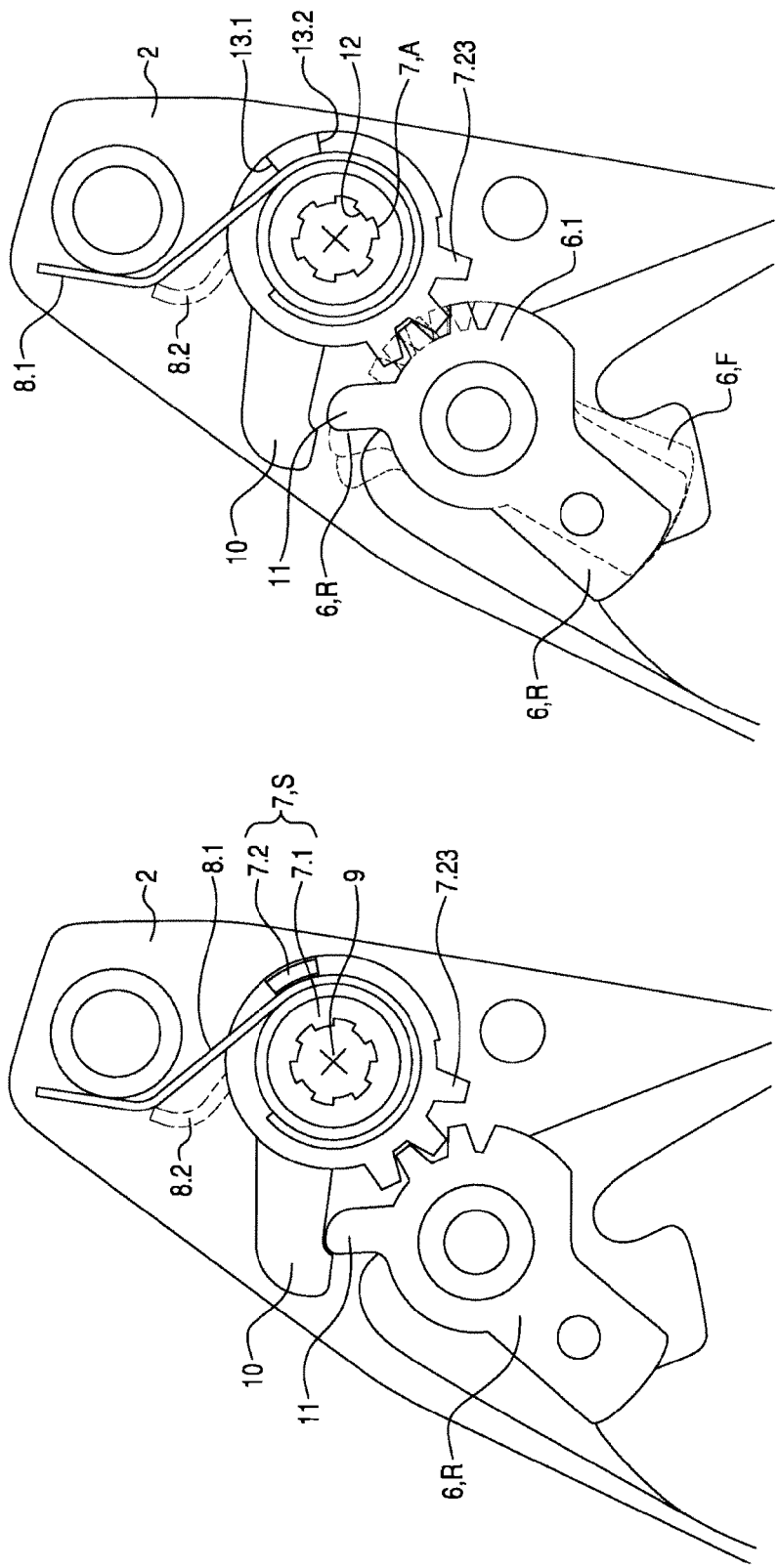

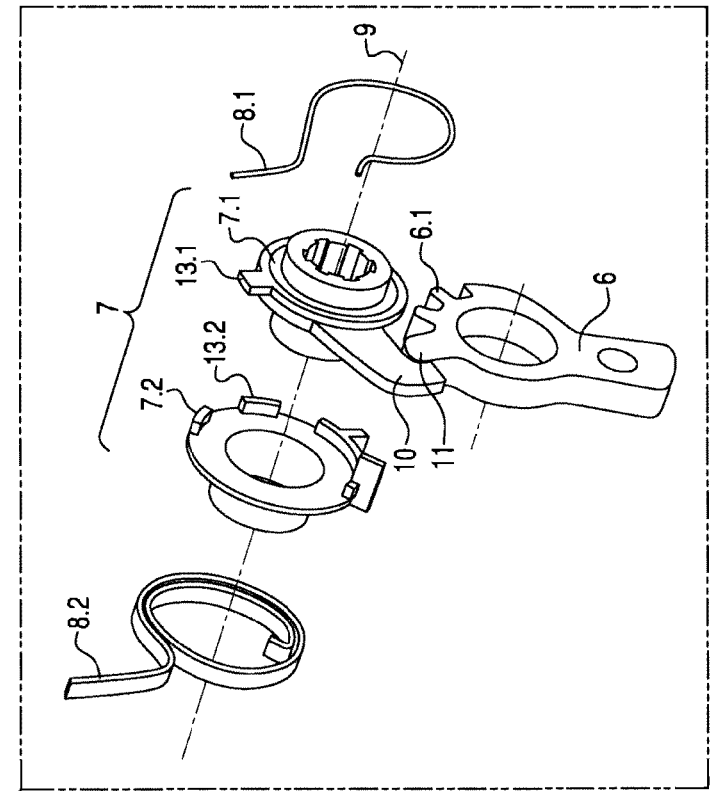
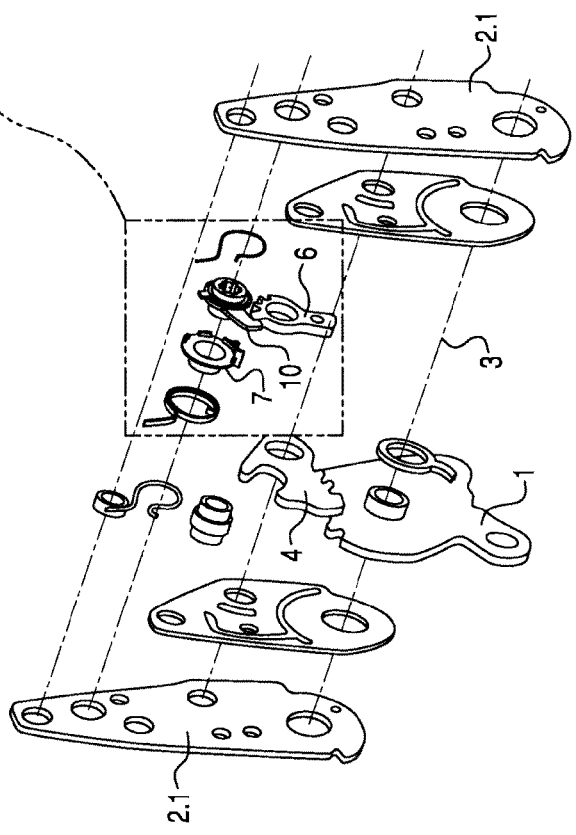

LOCKING AND RELEASING MECHANISM FOR VEHICLE SEAT

CROSS-REFERENCE TO RELATED PATENT APPLICATIONS

This application is a divisional of U.S. patent application Ser. No. 11/964,453, filed Dec. 26, 2007, now U.S. Pat. No. 8,070,231, which is a continuation of International Application No. PCT/EP2006/006166 filed on Jun. 27, 2006, which claims the benefit of German Patent Application No. 102005030050.2 filed on Jun. 27, 2005 and German Patent Application No. 102005037832.3 filed on Aug. 8, 2005. The entire disclosures of U.S. patent application Ser. No. 11/964,453, International Application No. PCT/EP2006/006166, German Patent Application No. 102005030050.2, and German Patent Application No. 102005037832.3 are incorporated herein by reference.

BACKGROUND

The present disclosure relates to a locking and releasing mechanism for adjusting the inclination of a seat (i.e., a locking and releasing mechanism). In particular, the present disclosure relates to a locking and releasing mechanism for a vehicle seat, a vehicle seat with a locking and releasing mechanism and a method for securing a locking and releasing mechanism against self-opening.

Locking and releasing mechanisms are designed to withstand high loads in order not to be opened and to be displaced inadvertently when used in motor vehicle seats (e.g., in the event of an accident). However, it has been demonstrated that certain locking and releasing mechanisms tend to open inadvertently under high loads. Attempts have been made to provide safety catches which prevent such automatic opening. For example, DE 100 48 127 A1 discloses a fitting for a vehicle seat in which locking elements are provided on a pivotably mounted clamping eccentric for securing the pawl and which prevent the displacement of the clamping eccentric in the event of an accident, so that the pawl is not able to be opened. The disclosed mechanism, however, has the drawback that it has to be manufactured and mounted with very fine tolerances which has a disadvantageous effect on production and assembly costs.

Thus, there remains a need to provide a locking and releasing mechanism, in particular for a motor vehicle seat, which does not have the drawbacks of the prior art.

SUMMARY

An exemplary embodiment relates to a locking and releasing mechanism for a seat having a first fitting part associated with one of a seat part and a backrest and a second fitting part associated with the other one of the seat part and the backrest that may be locked and released relative to one another by the mechanism. The mechanism includes a detent pawl configured to selectively latch the first fitting part to lock a displacement of the first fitting part and the second fitting part relative to one another and a detent plate configured to be reversibly displaced between a detent position, wherein the detent plate locks the detent pawl so that the detent pawl remains latched with the first fitting part, and a release position, wherein the detent plate allows the detent pawl to be released from the first fitting part. The mechanism also includes drive means configured to selectively move the detent plate between the detent position and the release position. The drive means includes a securing segment for securing the detent plate against self opening.

Another exemplary embodiment relates to a seat recliner. The seat recliner includes first and second fitting parts. The second fitting part is selectively displaceable relative to the first fitting part. The seat recliner also includes a detent pawl supported at the second fitting part and movable between a first position wherein the second fitting part is locked relative to the first fitting part and a second position wherein the second fitting part is released relative to the first fitting part. The seat recliner further includes a detent plate supported at the second fitting part and movable between a detent position for securing the detent pawl in the first position and a release position for allowing the detent pawl to move to the second position. The seat recliner further includes a driver configured to selectively move the detent plate between the detent position and the release position. The driver includes a securing segment for securing the detent plate against self opening.

Another exemplary embodiment relates to a seat recliner that includes first and second fitting parts, the second fitting part being selectively displaceable relative to the first fitting part, a detent pawl supported at the second fitting part and movable between a first position wherein the second fitting part is locked relative to the first fitting part and a second position wherein the second fitting part is released relative to the first fitting part, a detent plate supported at the second fitting part and movable between a detent position for securing the detent pawl in the first position and a release position for allowing the detent pawl to move to the second position, a blocking member supported at the second fitting part, a securing member arranged between an outer contour of the detent plate and the blocking member and a driver configured to selectively move the detent plate between the detent position and the release position.

Another exemplary embodiment relates to a vehicle that includes a seat part, a backrest, a first fitting part supported at the seat part, a second fitting part supported at the backrest; and a recliner. The recliner includes a detent pawl supported at the second fitting part and movable between a first position wherein the second fitting part is locked relative to the first fitting part and a second position wherein the second fitting part is released relative to the first fitting part, a detent plate supported at the second fitting part and movable between a detent position for securing the detent pawl in the first position and a release position for allowing the detent pawl to move to the second position and a driver configured to selectively move the detent plate between the detent position and the release position. The driver includes a securing segment for securing the detent plate against self opening.

Another exemplary embodiment relates to a method of locking and releasing a recliner mechanism. The method includes providing a driver with a securing segment and a second segment, providing a detent plate and providing a detent pawl. The method also includes displacing the securing segment from a securing position into a drive position and displacing the detent plate with the driver from a detent position, wherein the detent plate locks the displacement of the detent pawl, into a release position, wherein the detent plate does not lock the displacement of the detent pawl so that the mechanism released.

BRIEF DESCRIPTION OF THE DRAWINGS

FIG. 3 is a side view of a locking and releasing mechanism according to another exemplary embodiment.

FIG. 4 is a detailed side view of the locking and releasing mechanism of FIG. 3.

FIG. 5 is another detailed side view of the locking and releasing mechanism of FIG. 3.

FIGS. 6a-6b is a partially exploded perspective views of the locking and releasing mechanism of FIG. 3.

DETAILED DESCRIPTION

Figure 1A:
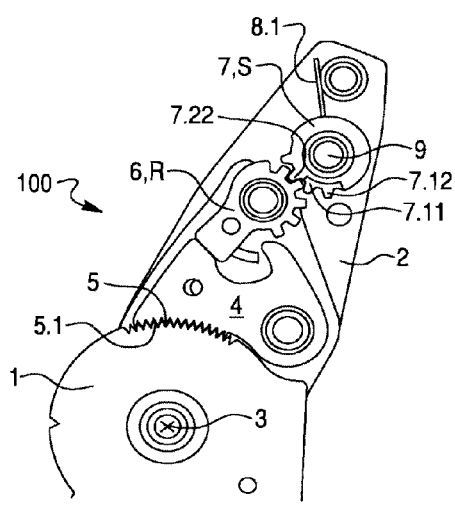
FIGS. 1a-1d are side views of a locking and releasing mechanism according to an exemplary embodiment.

Referring generally to the Figures, a locking and releasing mechanism is shown according to an exemplary embodiment. The locking and releasing mechanism is shown as being used with a motor vehicle seat having a first fitting part and a second fitting part. The locking and releasing mechanism allows the displacement of the first fitting part and/or the second fitting part to be locked and released relative to one another. The locking and releasing mechanism includes a drive means or driver, a detent plate and a detent pawl. By latching to the first fitting part, the detent pawl is able to be locked relative thereto. The detent plate is able to be reversibly displaced by means of the drive means. The detent plate locks the displacement of the detent pawl in a detent position and releases the displacement in a release position. The drive means or driver comprises a securing segment for securing the detent plate against self-opening.

The additional securing segment of the drive means or driver secures the detent plate against self-opening. As a result, the detent plate remains securely in the detent position and locks the detent pawl so that the mechanism is locked under high loads. For purposes of the present disclosure, the phrase a "detent position" is used broadly to refer to any position of the detent plate in which the detent plate locks the detent pawl and the phrase "a release position" is used broadly to refer to any position of the detent plate in which it does not lock the detent pawl.

As noted above, the mechanism remains securely in the detent position under high loads. The presence of the securing segment allows the locking angle to be optimized so that it is possible for the releasing to be easier and therefore more comfortable for the user. The free space created by the securing segment may be used for a comfort-oriented design.

According to an exemplary embodiment, the drive means or driver may be displaced at least partially reversibly from a drive position into a securing position. According to such an embodiment, the displacement of the detent plate from the detent position into the release position is only possible when the drive means or driver is in the drive position.

Accordingly to an exemplary embodiment, the drive means or driver has to be displaced at least partially into the drive position so that the detent plate may be displaced into the release position. Provided that the drive means or driver is not driven, an inadvertent displacement of the detent plate, and a self-opening of the mechanism, in which the detent plate is displaced from the detent position into the release position, is not possible. According to such an embodiment, the mechanism is securely locked in the detent position under high loads.

According to an exemplary embodiment, the drive means or driver comprises a securing segment and a second segment. According to such an embodiment, the detent plate may either be displaced only by means of the second segment or by means of the second segment and the securing segment together from the detent position into the release position and back.

According to an exemplary embodiment, the drive means or driver may be rotated about a drive axle. As such, the securing segment is able to be displaced by rotating the drive means or driver about the drive axle from the securing position into the drive position. Further, by rotating the drive means about the drive axle, the detent plate is able to be displaced from the detent position into the release position and back. Thus, the driving of the securing segment takes place on the same axis as the driving of the locking and releasing of the mechanism. No further components for actuating the securing segment are required.

According to an exemplary embodiment, the drive means or driver is actuated by means of a handle. A person skilled in the art, after reading the present disclosure, will understand that electrical actuation of the drive means or driver is also possible.

According to an exemplary embodiment, the second segment may be rotated counter to the force of a second force means or element about the drive axle so that the detent plate is held by means of the force of the second force means or element in the detent position.

According to an exemplary embodiment, the securing segment comprises a first positive and/or non-positive connecting means or connector and the second segment comprises a second positive and/or non-positive connecting means or connector. The first, as well as the second, positive and/or non-positive connecting means or connector is at least partially in engagement with a third positive and/or non-positive connecting means or connector of the detent plate. By the mutual engagement of the positive and/or non-positive connecting means or connector, a load on the detent plate also acts positively and/or non-positively on the drive means or driver, in particular on the securing segment.

According to an exemplary embodiment, the third positive and/or non-positive connecting means or connector of the detent plate is a toothing.

According to an exemplary embodiment, the first positive and/or non-positive connecting means or connector, as well as the second positive and/or non-positive connecting means or connector, is respectively at least two teeth with the same tooth spacing. According to an exemplary embodiment, the transitional tooth spacing between the front tooth of the first positive and/or non-positive connecting means or connector and the rear tooth of the second positive and/or non-positive connecting means or connector, which are adjacent to one another, are unequal to, preferably greater than, the tooth spacing. The transitional tooth spacing is an intentional spacing error of the toothing of the drive means or driver and/or between the securing segment and the second segment, which allows a no-load operation, by means of which the releasing of the mechanism is possible in a very uniform manner, when the releasing takes place by the drive means or driver. In contrast, the transitional tooth spacing between the teeth of the securing segment and the teeth of the second segment with a high load acting on the detent plate, by means of which the detent plate tends toward self-opening, leads to a collision of the toothing of the detent plate with that of the drive means or driver. According to such an embodiment, the detent plate is slightly displaced (e.g., due to tolerances) but is then securely stopped by the collision so that the detent plate remains in the detent position and the mechanism is further securely locked.

According to an exemplary embodiment, the detent plate may be rotated about a detent axis. According to such an embodiment, the no-load operation then corresponds to an angle of rotation of the detent plate of approximately three (3) degrees to approximately five (5) degrees.

According to an exemplary embodiment, the first positive and/or non-positive connecting means or connector is a securing means or member which, in the detent position, is in engagement with a front detent tooth of the third positive and/or non-positive connecting means of the detent plate. Under high load, the displacement of the detent plate from the detent position into the release position is blocked by cooperation of the detent tooth with the securing means or member.

A person skilled in the art, after reading the present disclosure, will understand that the detent tooth engages behind the securing means or member in the detent position. According to such an embodiment, the securing segment may be rotated counter to the force of a first force means or element about the drive axle so that the securing segment additionally holds the detent plate in the detent position by means of the force of the first force means or element. The first force means or element has the effect that under load (e.g., when the vehicle is being driven), the securing segment is held in one position and does not rattle.

According to an exemplary embodiment, the securing means or member also comprises a displacement means or member which in the detent position bears against a contour of the front detent tooth. According to such an embodiment, the displacement means or member is displaced when driving the securing segment before and/or during the displacement of the detent plate so that in the drive position of the securing segment, it does not hamper the detent plate when displaced.

When the drive means or driver is driven, the second segment, together with the securing segment, is displaced so that the securing means or member does not hamper the detent tooth. As a result of tolerances of the mechanism (e.g., as a result of manufacturing or production tolerances), no-load operation possibly occurs to a slight extent when displacing the detent plate from the detent position into the release position. The displacement is, however, substantially possible without an additional no-load operation. The angle of release is, therefore, smaller, in contrast to the aforementioned embodiment which provides an intentional additional no-load operation.

According to an exemplary embodiment, the securing segment comprises at least one stop and the second segment comprises at least one counterstop so that when displacing the drive means or driver, the second segment is displaced therewith from the securing segment.

According to an exemplary embodiment, the drive means or driver comprises a spline shaft profile which bears against the drive axle so that the second segment does not slip when rotating the drive axle.

The dividing of the drive means or driver into the securing segment and the second segment allows a considerably greater security against self-opening in the event of an accident. Such a configuration also allows the mechanism to be released more easily. The additional component cost of such a configuration is restricted to one or two components and is therefore very low. The drive means or driver may be rapidly and easily assembled by "fitting together." The additional production and assembly costs are therefore low.

According to another embodiment, a securing means or member is attached between an outer contour of the detent plate and a blocking means or member.

It was extremely surprising and unexpected for the person skilled in the art that the mechanism disclosed herein succeeds in reliably preventing automatic releasing of the detent pawl. The mechanism disclosed herein may be produced and assembled easily and cost-effectively. The mechanism disclosed herein is capable of functioning even with relatively high manufacturing tolerances. The blocking means or member is designed as a barrier which moves therewith so that it is possible to compensate for tolerances and no loss of strength occurs.

According to an exemplary embodiment, the mechanism comprises a securing means or member which is arranged for securing between the detent plate and the blocking means or member. According to an exemplary embodiment, the securing means is connected to the drive means, which moves the detent plate into the detent position and/or into the release position. As a result, at the same time the securing means or member may be either attached or removed with the respective displacement of the detent plate.

The securing means or member may be any securing means or member familiar to the person skilled in the art. According to an exemplary embodiment, the securing means is a ball, a cylinder or a securing means or member which is mounted to be rotatable in only one direction.

According to such an embodiment, a certain clearance is present between the detent plate, the blocking means or member and the securing means or member which is only eliminated during overload (e.g., in the event of a crash). Such an embodiment has the advantage that the mechanism may be operated with a relatively low expenditure of force under normal conditions.

The present disclosure also relates to a seat which comprises the mechanism disclosed herein. The security of the mechanism of the seat not being inadvertently released (e.g., in the event of an accident) is considerably improved. For example, when using the mechanism for locking and releasing the inclination of the backrest relative to the seat part of a seat in a motor vehicle, even when loading the backrest (e.g., by luggage which has slid into the passenger compartment during an accident), the inclination adjuster is not released. As such, the seat offers a greater security for the passengers. Moreover, the seat may be more easily locked.

The present disclosure further relates to a method for releasing the locking and releasing mechanism.

Turning now to the figures in detail, FIG. 1 shows a mechanism 100 according to an exemplary embodiment. The mechanism 100 is an inclination adjuster (i.e., recliner) for adjusting the inclination of a backrest (not shown) of a seat relative to the seat part (not shown) of the seat. The seat includes a first fitting part 1 configured to be arranged on the seat part and a second fitting part 2 configured to be arranged on the backrest of the seat. The first fitting part 1 and the second fitting part 2 are shown as having a common rotational axis 3. By rotating the second fitting part 2 about the rotational axis 3, the second fitting part 2 may be displaced relative to the first fitting part 1.

The mechanism 100 comprises a detent pawl 4 with positive and/or non-positive connecting means 5, as well as a detent plate 6. According to the embodiment illustrated, the connecting means 5 is a toothing. The detent plate 6 cooperates in its detent position R (shown in FIGS. 1*a*, 1*b* and 1*d*) positively and/or non-positively with the detent pawl 4, which in turn cooperates in a detent position R positively and/or non-positively with a countertoothing 5.1 of the first fitting part 1. The detent pawl 4 is rotatably arranged on the second fitting part 2. In the detent position R, both the second fitting part 2 and the detent pawl 4 are locked relative to the first fitting part 1.

Figure 1B:
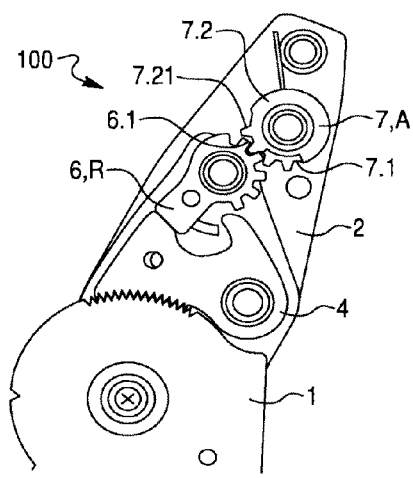
Figure 1C:
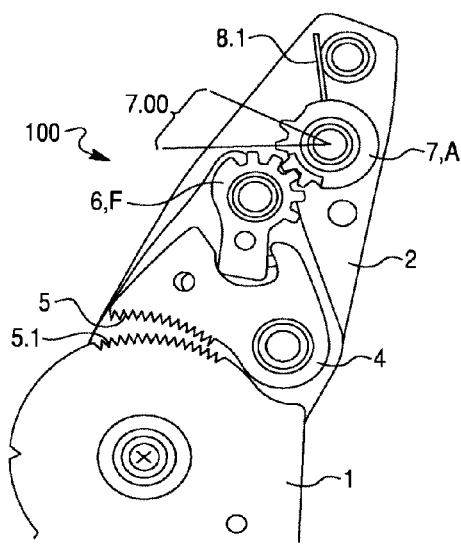

Referring to FIG. 1*c* in particular, the detent plate 6 is reversibly displaceable from the detent position R into a release position F by means of a drive means 7. In the release position F, the detent plate 4 cooperates positively and/or non-positively with the detent pawl 6 so that the detent pawl 6 is displaced (e.g., lifted from the first fitting part 1) and does not cooperate positively and/or non-positively with the first fitting part 1. With the detent pawl 6 displaced, the mechanism 100 is released in the release position F.

To facilitate the displacement of the detent plate 6, the drive means 7 comprises a securing segment 7.1 with a first positive and/or non-positive connecting means 7.11-7.1*i*, shown according to an exemplary embodiment as two teeth 7.11, 7.12 which are rigid relative to one another. The drive means 7 also comprises a second segment 7.2 with a second positive and/or non-positive connecting means 7.21-7.2*i*, shown according to an exemplary embodiment as two teeth 7.21, 7.22 which are rigid relative to one another. According to an exemplary embodiment, the teeth 7.11, 7.12 of the securing segment 7.1, as well as the teeth 7.21, 7.22 of the second segment 7.2, have the same tooth spacing 7.00. In contrast, the transitional tooth spacing 7.01 between the front tooth 7.11 of the securing segment 7.1 and the rear tooth 7.22 of the second segment 7.2, which rest against one another, is greater in a securing position S of the drive means 7 than the tooth spacing 7.00. According to such an embodiment, the teeth 7.11, 7.12 of the first positive and/or non-positive connecting means 7.11-7.1*i* and the teeth 7.21, 7.22 of the second positive and/or non-positive connecting means 7.21-7.2*i* have a spacing error at this transitional point.

The drive means 7 is rotatably arranged about a drive axle 9 which is connected to a handle (not shown).

To intentionally displace the detent plate 6 from the detent position R into the release position F, the drive means 7 is rotated about the drive axle 9 from the securing position S into a drive position A. According to an exemplary embodiment, the drive means 7 is rotated counter to the force of a first force means 8.1 (e.g., a spring). According to an exemplary embodiment, the transitional tooth spacing 7.01 between the front tooth 7.11 of the securing segment 7.1 and the rear tooth 7.22 of the second segment 7.2 is reduced until in the drive position A it is substantially the same as the tooth spacing 7.00 of the first positive and/or non-positive connecting means 7.11-7.1*i* and the second positive and/or non-positive connecting means 7.21-7.2*i* so that the tooth spacing 7.00 as well as the transitional tooth spacing 7.01 on the drive means 7 is uniform. According to an exemplary embodiment, the required angle of rotation, about which the drive means 7 is rotated from the securing position S into the drive position A, is approximately three (3) degrees to approximately five (5) degrees.

Figure 2:
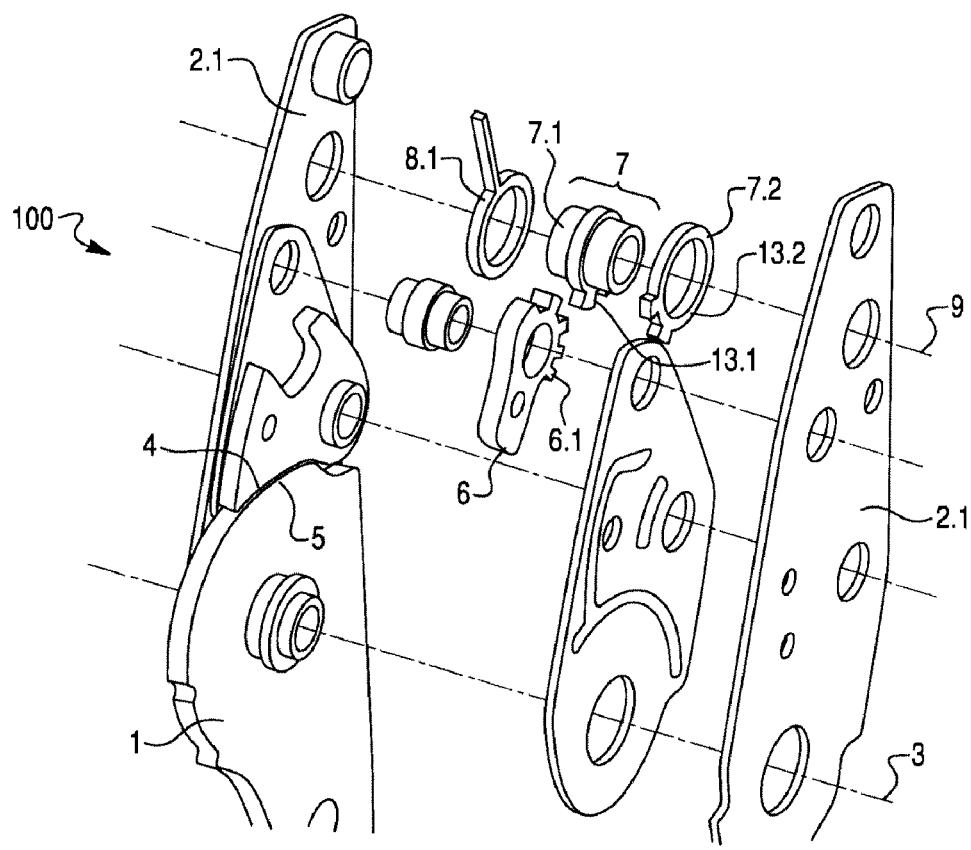
FIG. 2 is a partially exploded perspective view of the locking and releasing mechanism of FIG. 1.

According to an exemplary embodiment, the securing segment 7.1 and the second segment 7.2 are substantially rotated in synchronism. Referring to FIG. 2, the securing segment 7.1 has a stop 13.1 and the second segment 7.2 has a counterstop 13.2 which bear against one another in the drive position A so that the second segment 7.2 is driven along during further rotation. The detent plate 6 has third positive and/or non-positive connecting means 6.1, shown according to an exemplary embodiment as a partial toothing, which is at least partially in engagement with the first positive and/or non-positive connecting means 7.11-7.1*i* and the second positive and/or non-positive connecting means 7.21-7.2*i* when rotating the drive means 7 so that the detent plate 6 is displaced from the detent position R into the release position F.

FIGS. 1*a-c* show the displacement of the securing segment 7.1 from the securing position S into the drive position A and the detent plate 6 from the detent position R into the release position F. FIG. 1*a* shows the securing segment 7.1 in the securing position S and the detent plate 6 in the detent position R. In such positions, the mechanism 100 is locked. FIG. 1*b* shows the securing segment 7.1 in the drive position A and the detent plate 6 in the detent position R. In such positions, the mechanism 100 remains locked. FIG. 1*c* shows the securing segment 7.1 in the drive position A and detent plate 6 in the release position F. In such positions, the mechanism 100 is released.

Figure 1D:
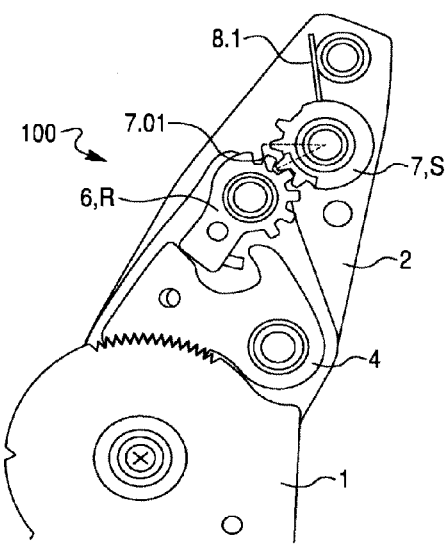

With a high load on the locked seat (e.g., in the event of an accident), the detent plate 6 in turn attempts (as a result of mass inertia) to displace the drive wheel 7 counter to the force of the force means 8.1 in the direction of the release position F, see FIG. 1*d*. As a result of the greater transitional tooth spacing 7.01 relative to the tooth spacing 7.00 of the first positive and/or non-positive connecting means 7.11-7.1*i* and the second positive and/or non-positive connecting means 7.21-7.2*i*, the third positive and/or non-positive connecting means 6.1 of the detent plate 6 may not engage in the teeth 7.11, 7.12 of the first positive and/or non-positive connecting means 7.11-7.1*i*.

The teeth 7.11, 7.12, 7.21, 7.22 of the drive means 7 may thus drive the detent plate 6, but an inadvertent release of the detent plate 6 is prevented by blocking the torque transmission between the detent plate 6 and the drive means 7. The detent plate 6 is possibly, therefore, slightly displaced from the detent position R in the direction of the release position F, the detent position R, however, remaining maintained insofar as the latching is secured and the mechanism is locked.

FIG. 1*d* shows the securing segment 7.1 in the securing position S and detent plate 6 in the detent position R under high load. The mechanism 100 is locked remains locked in these position.

In comparison to conventional mechanisms, the mechanism 100 disclosed herein has increased security against self-opening under high load, in particular in the event of an accident.

FIG. 2 shows an at least partially exploded view of the mechanism 100 according to an exemplary embodiment. According to the embodiment illustrated, the second fitting part 2 comprises two second fitting part components 2.1 which are substantially the same and which are arranged parallel to one another and between which the first fitting part 1, the detent pawl 4, the detent plate 6 as well as the drive means 7 are arranged.

FIG. 3 shows the mechanism 100 according to another exemplary embodiment. Similar to the embodiment detailed above with reference to FIGS. 1 and 2, the mechanism 100 comprises the first fitting part 1, the second fitting part 2, the detent pawl 4 and the detent plate 6. The second fitting part 2 is rotatable relative to the first fitting part 1 about the rotational axis 3. In order to lock the rotation of the second fitting part 2, the detent pawl 4 comprises the toothing 5 as positive and/or non-positive connecting means by means of which it is in engagement with the countertoothing 5.1 of the first fitting part 1. The detent pawl 4 is secured by the detent plate 6 in the detent position R and may be displaced into the release position F, in which the mechanism 100 is released. Moreover, the mechanism 100 also comprises a drive means 7 with a securing segment 7.1 and a second segment 7.2 which may be rotated about the drive axle 9.

In contrast to the mechanism 100 shown in FIGS. 1 and 2, the first positive and/or non-positive connecting means 7.11-7.1i of the securing segment 7.1 is a securing means 10 in the form of a hook which in the detent position R of the detent plate 6 cooperates positively and/or non-positively with the front detent tooth 11 of the third positive and/or non-positive connecting means 6.1 of the detent plate 6. Moreover, the mechanism 100 comprises a first force means 8.1 as well as a second force means 8.2. The securing segment 7.1 is displaceable counter to the force of the first force means 8.1 and the second segment 7.2 is displaceable counter to the force of the second force means 8.2. The two force means 8.1, 8.2 thus hold the detent plate 6 in the detent position R.

FIG. 4 shows an enlarged detailed view of the detent plate 6 (shown in FIG. 3) in the detent position R as well as the drive means 7 in the securing position S. The detent plate 6 may not be inadvertently opened by the action of external forces, which for example act on the detent pawl 4, since the securing means 10 cooperate positively and/or non-positively with the detent tooth 11 to block a displacement of the detent plate 6.

FIG. 5 shows the releasing of the mechanism 100 of FIGS. 3 and 4 with the detent plate 6 in the detent position R, R' and in the release position F and the drive means 7 in the drive position A. When actuating the handle (not shown), which generates a torque introduced via a spline shaft profile 12 of the drive means which bears against the drive axle 9, the securing means 10 is rotated counter to the force of the first force means 8.1 until the detent tooth 11 is no longer surrounded by the hook-like securing means 10. As a result, substantially no additional displacement of the drive means 7 (i.e., substantially no additional no-load operation) is required. Moreover, the torque is transmitted via the first stop 13.1 of the securing segment 7.1 and the second stop 13.2 of the second segment 7.2 to the second segment 7.2 so that the securing segment 7.1 and the second segment 7.2 are rotated about the drive axle 9 in synchronism. With the first stop 13.1 engaging the second stop 13.2 so as to rotate the securing segment 7.1 and the second segment 7.2 in synchronism, the detent plate 6 is displaced into the release position F. According to an exemplary embodiment, the first and the second force means are springs.

FIG. 6 shows the mechanism according to another exemplary embodiment with a drive means 7 that is similar to that shown in FIGS. 4 and 5. According to the embodiment illustrated, the second fitting part 2 includes two second fitting part components 2.1 which are substantially the same and which are arranged parallel to one another and between which the first fitting part 1, the detent pawl 4, the detent plate 6 as well as the drive means 7 are arranged.

Figure 7:
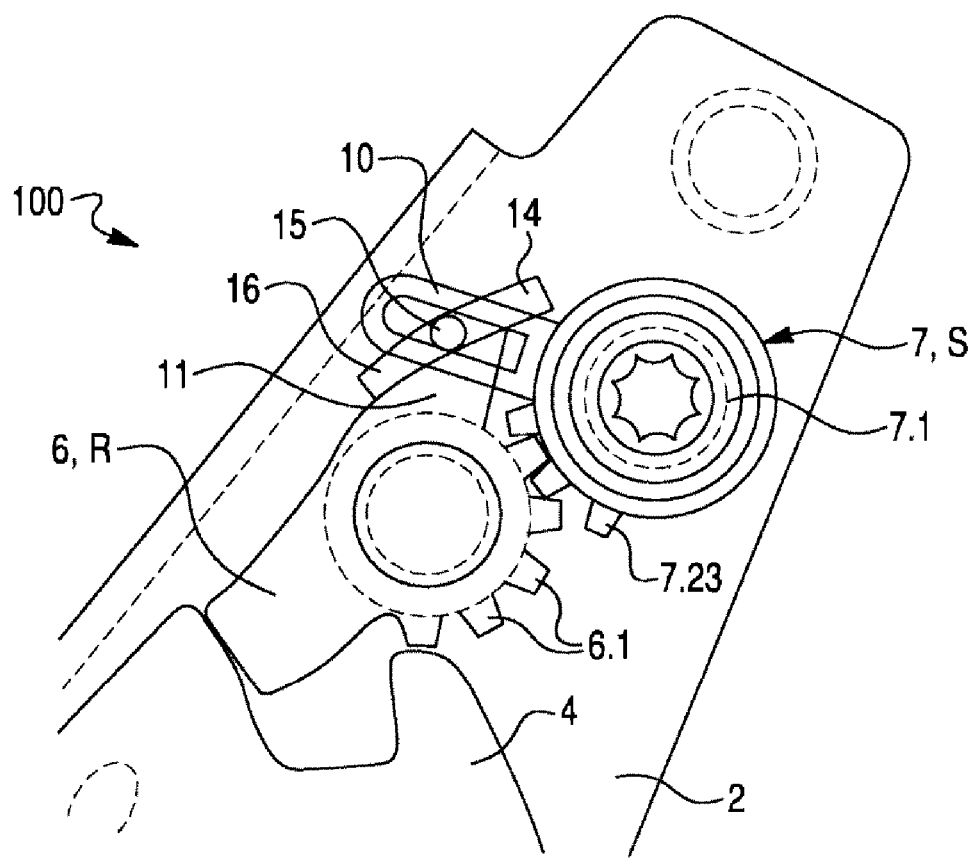
FIG. 7 is a side view of a locking and releasing mechanism according to another exemplary embodiment.

FIGS. 7 and 8 show the mechanism 100 according to another exemplary embodiment. According to the embodiment illustrated, the securing segment 7.1 comprises as a slot as the securing means 10 and a bolt as the displacement means 15, which may be displaced along the slot. According to such an embodiment, the displacement means 15 is guided along a guide means 14 of the second fitting part 2. The guide means 14 is also shown as a slot. FIG. 7 shows the detent plate 6 in the detent position R and the securing segment 7.1 of the drive means 7 in the securing position S. When displacing the securing segment 7.1 from the securing position S into the drive position A, the bolt 15 is displaced along a contour 16 of the front detent tooth 11 of the third positive and/or non-positive connecting means 6.1 of the detent plate 6. In this connection, the detent plate 6 is simultaneously displaced by means of the second positive and/or non-positive connecting means 7.21-7.2i of the second segment 7.2.

Figure 8A:
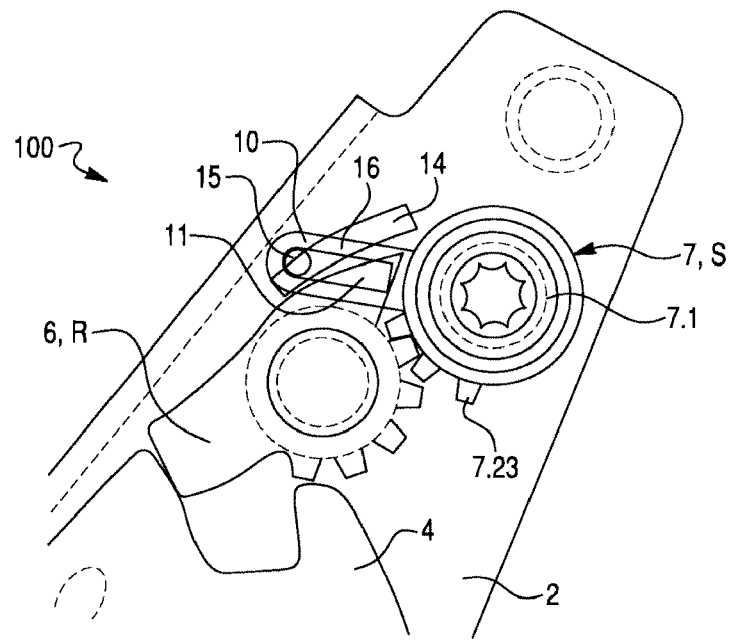
FIGS. 8a-8c are side views of the locking and releasing mechanism of FIG. 7.
Figure 8B:
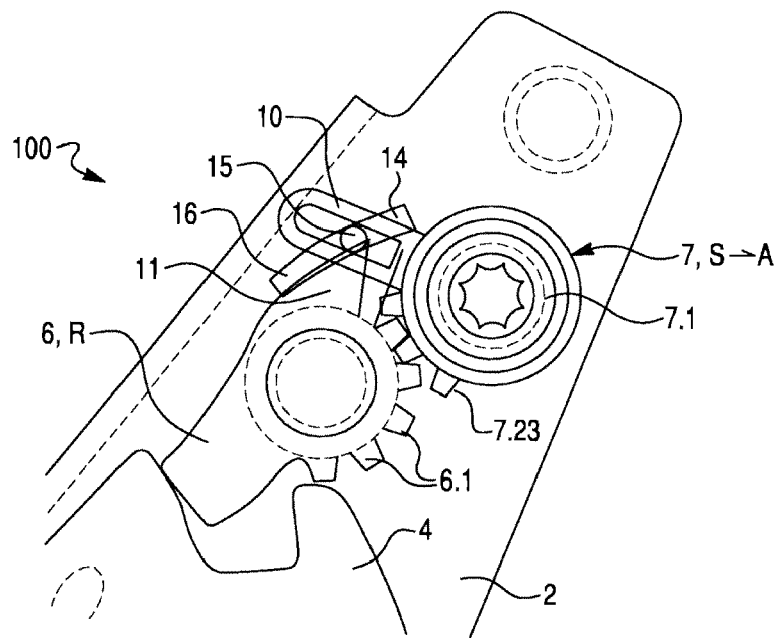
Figure 8C:
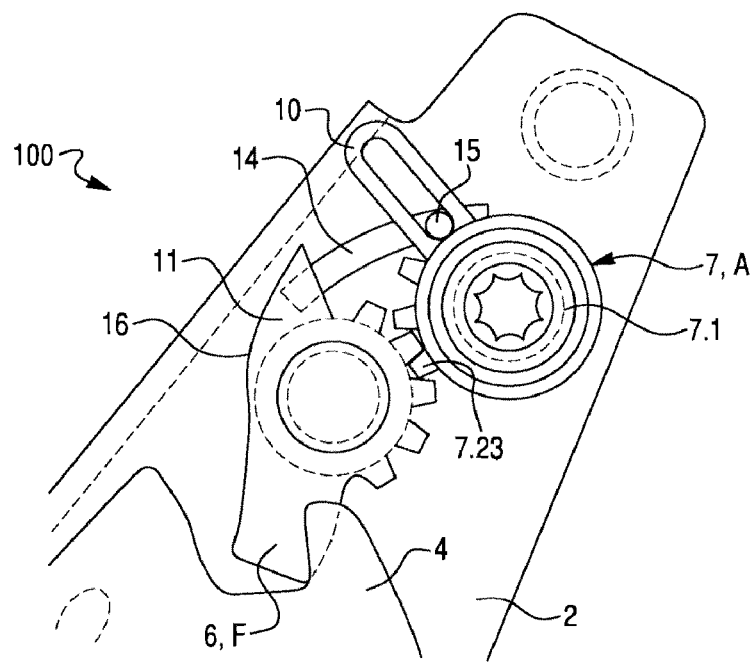

FIG. 8a shows the locked state of the mechanism 100. When the drive means 7 is not displaced, the detent plate 6 is secured by the bolt 15 in every detent position R. FIG. 8b shows a position of the securing segment 7.1 when the securing segment 7.1 is displaced from the securing position S into the drive position A. The detent plate 6 is still located in the detent position R. In order to increase further the security against self-opening, the guide means 14 has a curvature so that a displacement of the bolt 15 due to a high load is prevented. The curvature is, moreover, provided such that the displacement of the bolt 15 in the drive position A of the securing segment 7.1 and/or in the release position F of the detent plate 6 takes place easily. In the drive position A of the securing segment 7.1, the bolt 15 is arranged such that it does not hinder the displacement of the detent plate. FIG. 8c shows the securing segment 7.1 in the drive position A. The detent plate 6 is located in the release position F. The detent pawl 4, which is not shown here, and/or the mechanism 100 is released.

Figure 9:
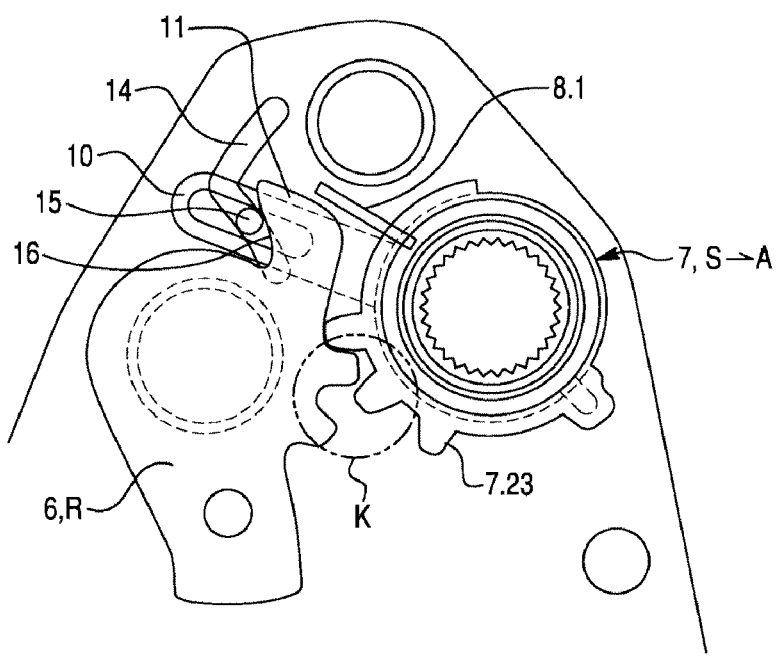
FIG. 9 is a side view of a locking and releasing mechanism according to another exemplary embodiment.

FIG. 9 shows the mechanism 100 according to another exemplary embodiment. Similar to the exemplary embodiment shown in FIGS. 7 and 8, the securing means 10 includes a slot and a bolt 15 as well as a guide means 14 in the form of a slot. In contrast to the mechanism 100 of FIGS. 7 and 8, the guide means 14 comprises a curvature and/or the detent plate 6 comprises a contour 16 by means of which an intentional additional displacement of the drive means 7 (i.e., a no-load operation) is required before the securing segment 7.1 has reached the drive position A, in which the detent plate 6 may be displaced from the detent position R into the release position F. In FIG. 9, the securing segment 7.1 is still located and/or again located in the securing position S. The detent plate 6 is located in the detent position R. The circle K shows the engagement of the second positive and/or non-positive connecting means 7.21-7.2i of the second segment 7.2 with the third positive and/or non-positive connection means 6.1 of the detent plate 6. The second positive and/or non-positive connecting means 7.21-7.2i and the third positive and/or non-positive connecting means 6.1 are not completely in engagement with one another.

For the exemplary embodiments shown in FIGS. 7 through 9, the drive means 7 may be in one piece so that the securing segment 7.1 and the second segment 7.2, apart from the bolt 15 of the securing means 10, are in one piece.

A conventional locking and releasing mechanism with a drive means which does not comprise a securing segment 7.1 may be adapted to the requirements of a seat, merely by replacing the drive means of the conventional locking and releasing mechanism with a drive means 7 of a type disclosed herein with a securing segment 7.1 and a second segment 7.2. The adaptation of the seat according to the requirements is therefore easily and cost-effectively possible with a modular design.

Figure 10A:
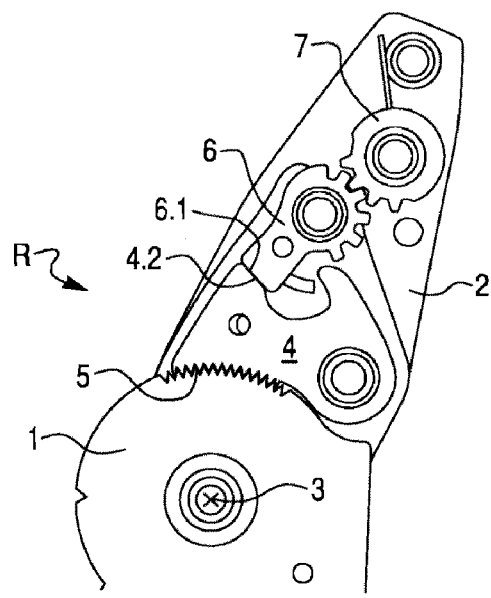
FIGS. 10a-10b are side views of a locking and releasing mechanism shown without a blocking and securing means.
Figure 10B:
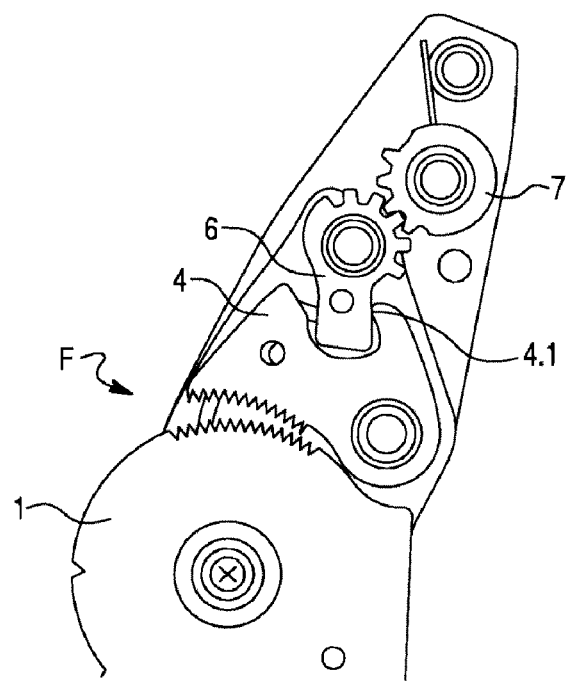

FIG. 10 shows a locking and releasing mechanism without a blocking or a securing means. The mechanism 100 comprises a detent pawl 4 with positive and/or non-positive connecting means 5, in this case a toothing, as well as a detent plate 6. The detent plate 6 cooperates in its detent position R (see FIG. 10a) positively and/or non-positively with the detent pawl 4, which in turn cooperates positively and/or non-positively in a detent position R with the countertoothing of the first fitting part 1. The positive and/or non-positive connection between the detent plate 6 and the detent pawl 4 is carried out by a cooperation of the surfaces 6.1 and/or 4.2. The detent pawl 4 may be rotatably arranged on the second fitting part 2 so that both the second fitting part 2 and the detent pawl 4 have to be locked in the detent position R relative to the first fitting part 1. The detent plate 6 is reversibly displaceable from the detent position R (see FIG. 10a) counterclockwise into a release position F (see FIG. 10b) by means of a drive means 7. In the release position F, the detent plate 4 cooperates with the detent pawl 6 such that the detent plate 4 rotates clockwise. In the present case, the detent plate 6 presses against the surface 4.1 of the detent pawl and rotates said detent pawl clockwise. As a result, the detent pawl 4 no longer positively and/or non-positively cooperates with the first fitting part 1. The mechanism 100 is therefore released in the release position F.

With a high load on the locked seat (e.g., in the event of an accident), the detent plate 6 attempts (e.g., due to mass inertia) to rotate counterclockwise, which may lead to a release of the detent pawl 4. In order to prevent this, the mechanism 100 a blocking and securing means is added to the mechanism as shown in FIGS. 11-16.

Figure 11:
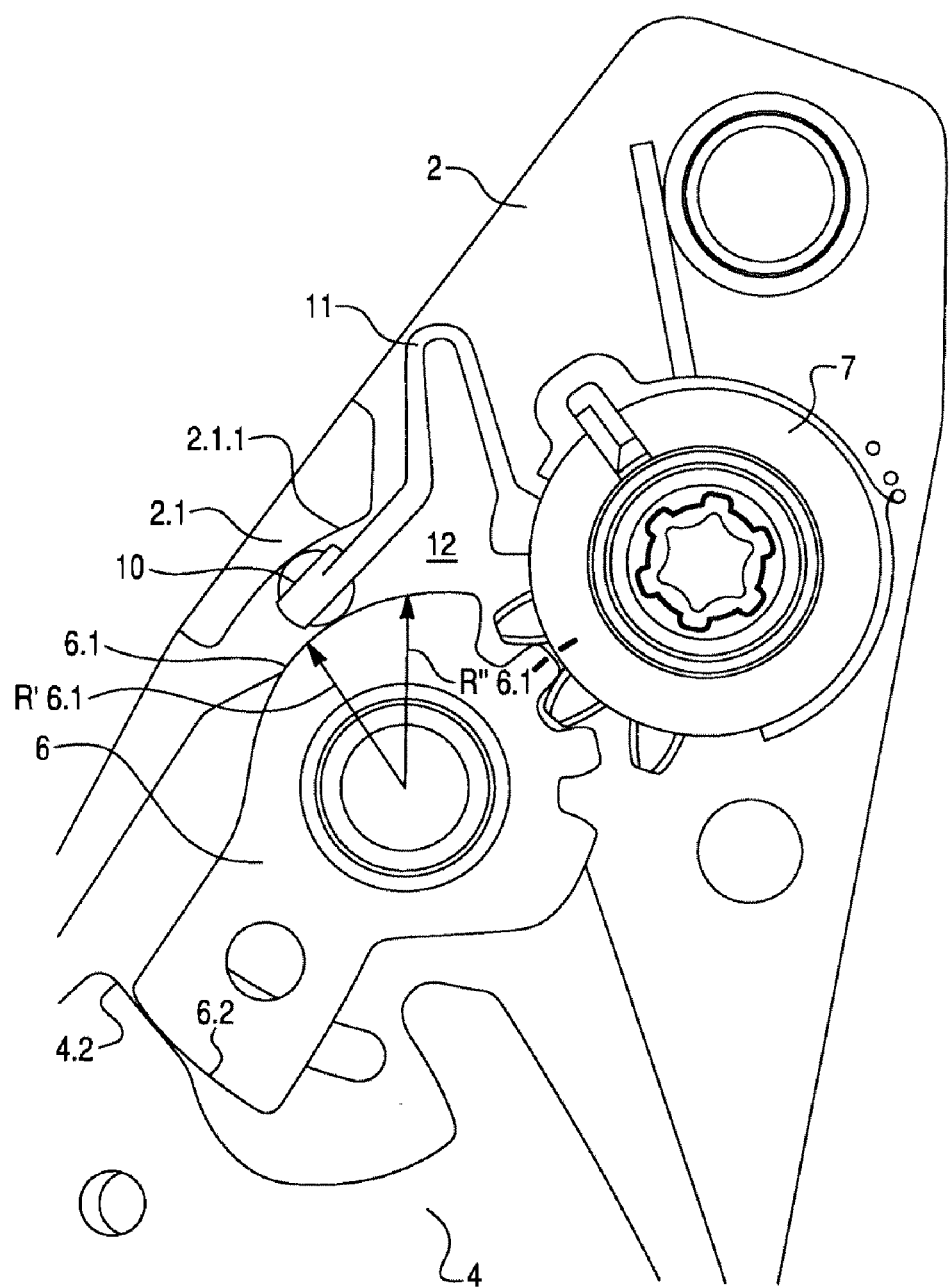
FIG. 11 is a side view of a locking and releasing mechanism according to another exemplary embodiment.

FIG. 11 shows the mechanism 100 according to another exemplary embodiment in the locked and blocked state in which an inadvertent self-opening of the recliner is eliminated. According to the embodiment illustrated, the mechanism 100 comprises a blocking means, shown as a projection 2.1 arranged on the fitting 2. Moreover, between the projection 2.1 and the detent plate 6, a securing ball 10 is arranged. The ball 10 is connected with an elastically flexible connecting means 11 to the drive 7. According to an exemplary embodiment, the connection and/or the drive 7 is designed such that the connecting means 11 in the respective rotational direction of the drive 7 is only driven when this takes place mechanically or manually (i.e., intentionally), but not induced by a crash. The drive 7 and the connecting means 11 are designed and adapted to one another, such that the ball 10 is brought into a quite specific position in the gap in which there is still a clearance, which, according to an exemplary embodiment is as small as possible, between the ball and the adjacent contours 6.1 and 2.1.1. Moreover, the drive 7 is designed such that with the intentional clockwise rotation thereof, initially the ball 10 is at least partially removed from the gap 12, before the detent plate 6 begins to rotate. Moreover, as shown in FIG. 11, the ball 10 is arranged between the contour 2.1.1 of the projection 2.1 and the contour 6.1 of the detent plate 6. In normal operation, a certain clearance (not shown) exists between the contours and the ball 10 at least on one side. This clearance allows the displacement of the two plates 1, 2 toward one another. With the danger of self-opening of the recliner (e.g., in the event of a crash), the clearance is initially eliminated before the ball 10 adopts its actual securing function. The contour 6.1 is designed as a curve (with the radius of the curve shown as increasing clockwise) so that the radius R"6.1 is greater than the radius R'6.1. The same applies to the contour 2.1.1, the inclination of which increases clockwise. As a result, in every position of the ball, a self-locking wedge angle results between the ball 10 and the contours 6.1 and 2.1.1 which prevents a self-opening of the recliner (i.e., the ball is clamped between the two contours 6.1 and 2.1.1 during a crash in which the detent plate 6 might rotate counterclockwise) and is not forced out of the gap 12 which is present between the two contours. The ball 10 thus prevents the detent plate 6 from being inadvertently automatically rotated counterclockwise and thus the engagement of the surfaces 4.2 and 6.2 from being released.

Figure 12:
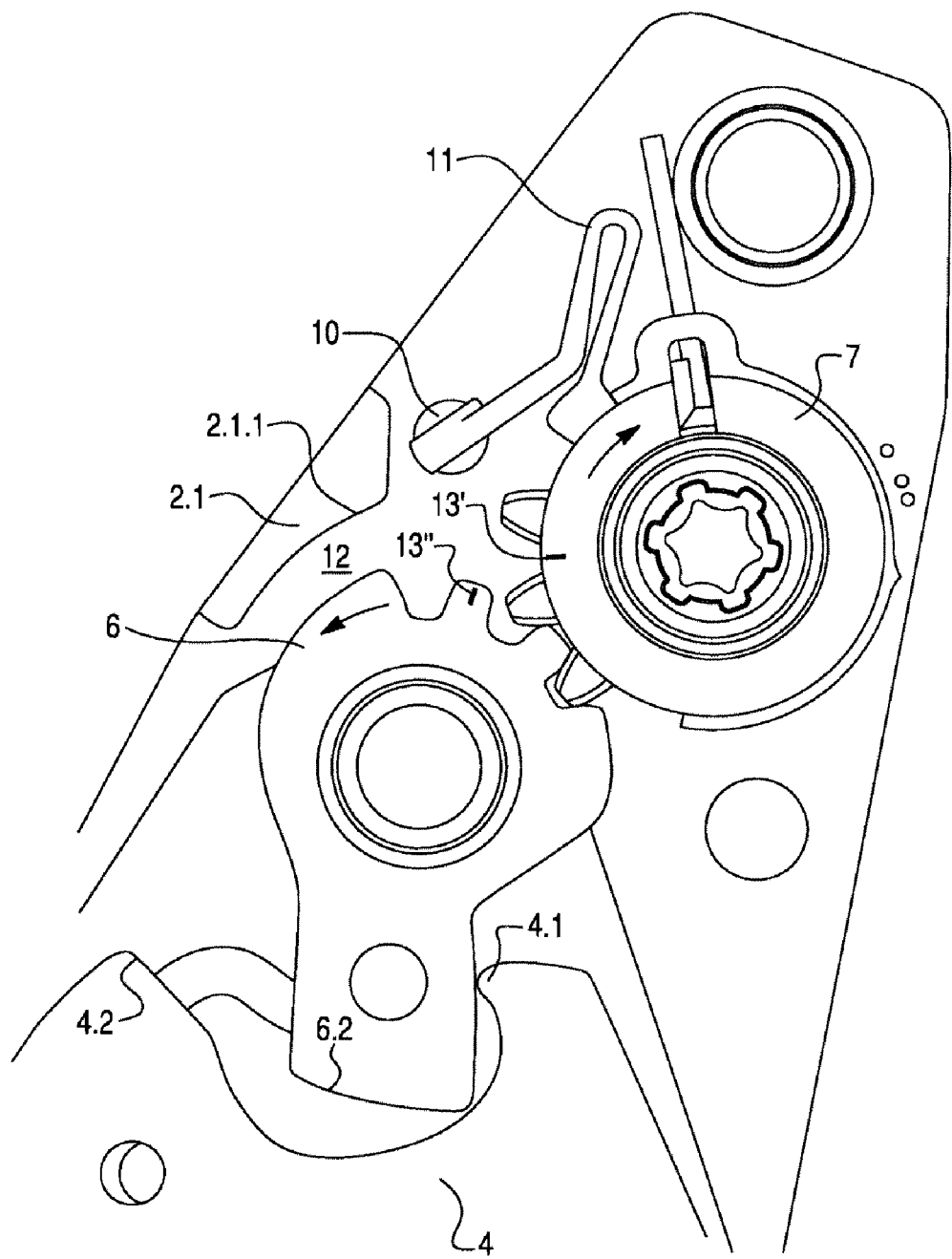
FIG. 12 is a side view of the locking and releasing mechanism of FIG. 11.

FIG. 12 shows the mechanism 100 of FIG. 11 in the unblocked and released state. To achieve this state, the drive 7 was manually or mechanically (i.e. intentionally) rotated clockwise, which may be seen with reference to the marking lines 13' and 13", which no longer overlap, in contrast to the view according to FIG. 11. By rotating the drive 7, firstly the connecting means 11 was driven and as a result initially pulled the ball 10 at least partially out of the gap 12. After a short time interval, the drive 7 rotated the detent plate 6, as shown by the arrow, counterclockwise and thus released the latching engagement between the surfaces 4.2 and 6.2. By rotating the detent plate 6 counterclockwise, the detent plate 6 comes into engagement with the lug 4.1 of the detent pawl so that the detent pawl 4, with a further rotation of the detent plate 6, rotates clockwise and, as visible in FIG. 10b, is lifted off from the first fitting part 1. When the drive 7 rotates counterclockwise, firstly the detent plate 6 is rotated clockwise and secondly the detent pawl 4 is rotated counterclockwise so that the detent pawl 4 again cooperates positively and/or non-positively with the fitting 1 and the detent plate 6 again comes into latching engagement with the detent 4. The ball 10 is inserted, after a time delay, into the gap 12 and acts there in a securing manner against inadvertent self-opening of the engagement between the detent plate 6 and the detent pawl 4.

Figure 13:
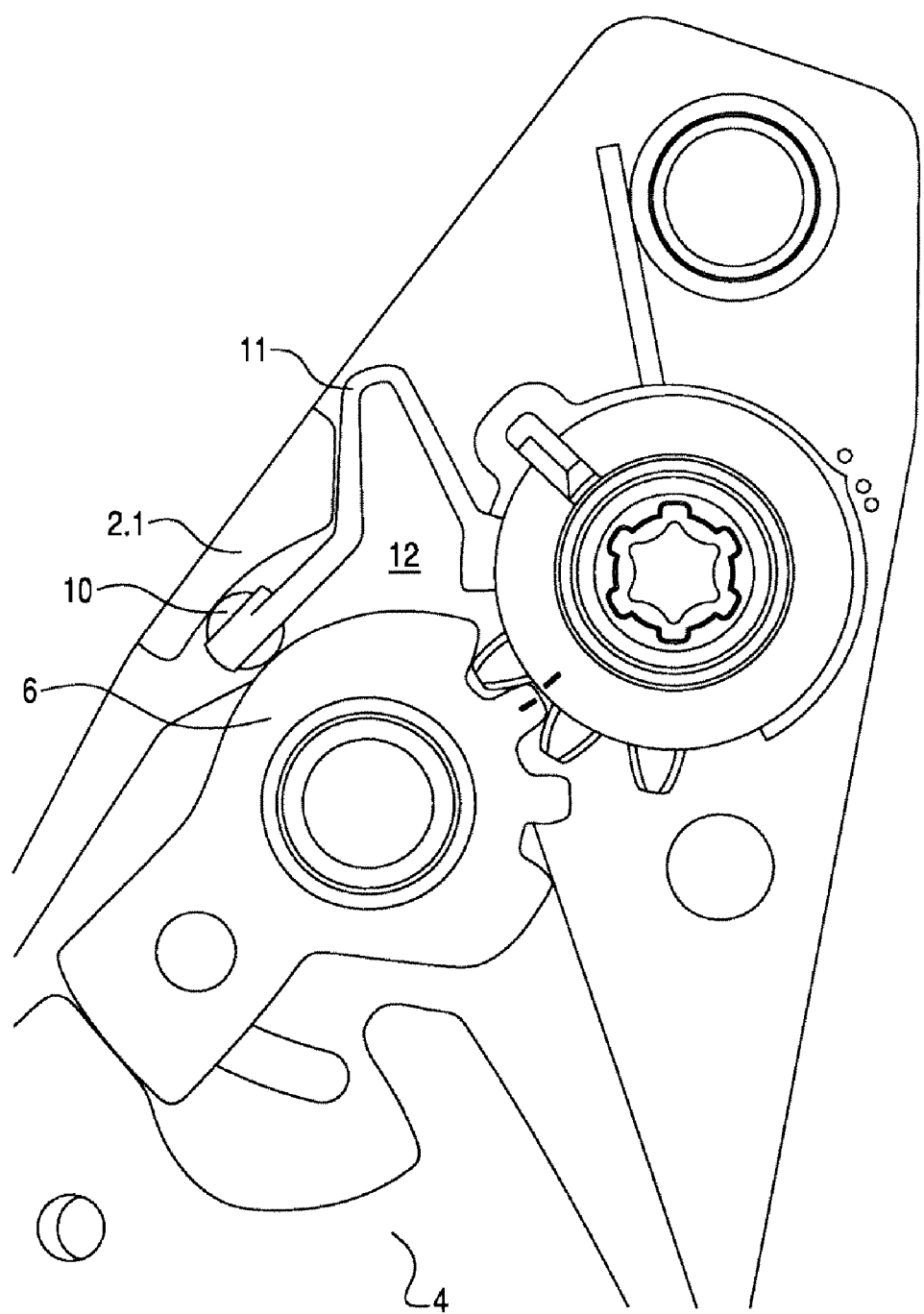
FIG. 13 is a side view of the locking and releasing mechanism of FIG. 11 shown with maximum clearance.
Figure 14:
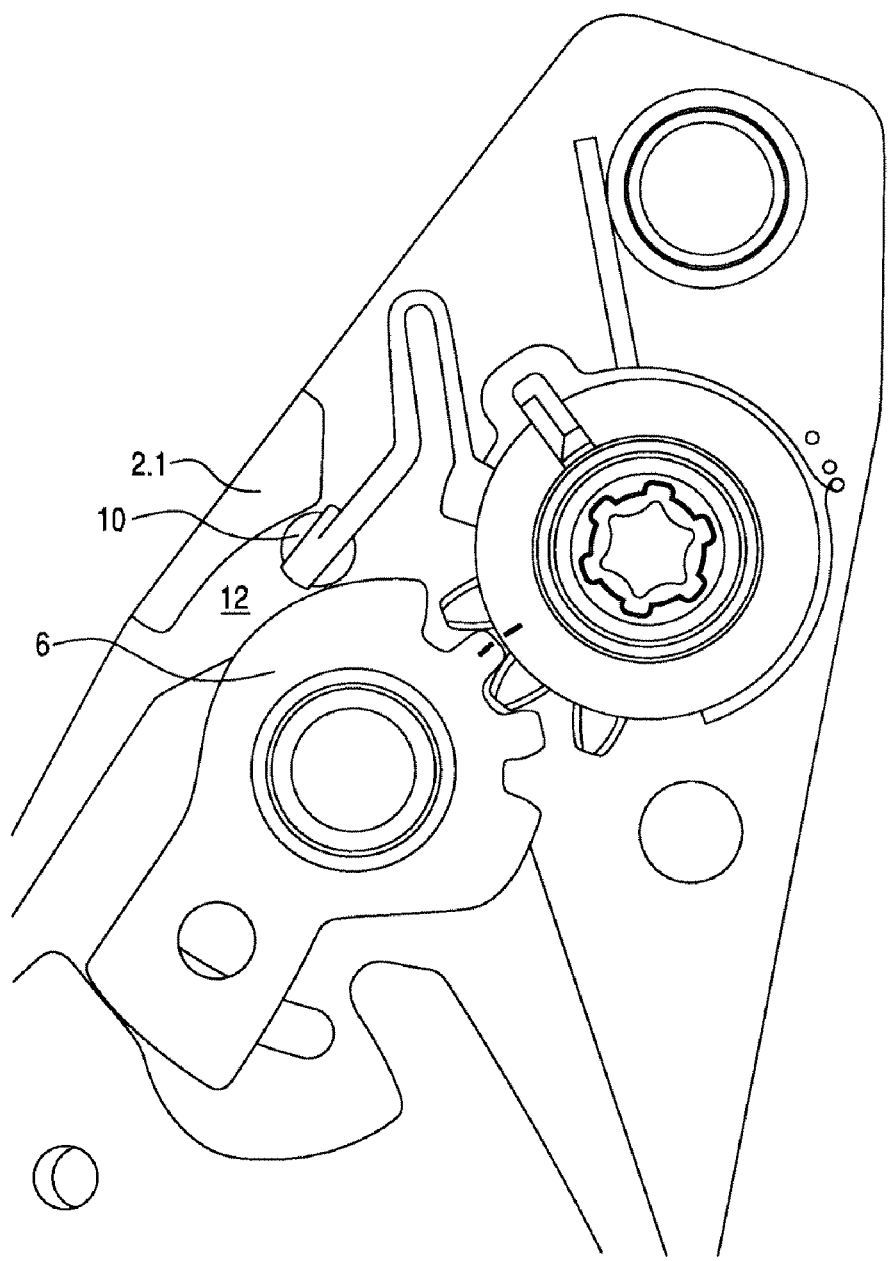
FIG. 14 is a side view of the locking and releasing mechanism of FIG. 11 shown with minimum clearance.

With reference to FIGS. 13 and 14, it is shown that the mechanism 100 may also function with relatively large manufacturing tolerances. FIG. 13 shows the so-called "min-material position" (i.e., the position in which all tolerances are added together so that the gap 12 reaches its maximum size). According to such an embodiment, the ball 10 is positioned by the drive 7 and/or the connecting means 11 very deeply into the gap 12 so that in the event of a crash, the detent plate 6 only has to carry out a very small rotation before the blocking function of the ball 10 occurs. This minimal no-load operation of the detent plate 6 causes no loss of strength of the recliner. FIG. 14 shows the so-called "max-material position" (i.e., the position in which the manufacturing tolerances are added together so that the gap 12 in the context of the manufacturing tolerances is at a minimum). According to such an embodiment, the ball 10 is positioned by the drive 7 and/or the connecting means 11 on the upper end of the gap 12 and acts in a blocking manner there without the functionality of the safety catch being impaired.

Figure 15:
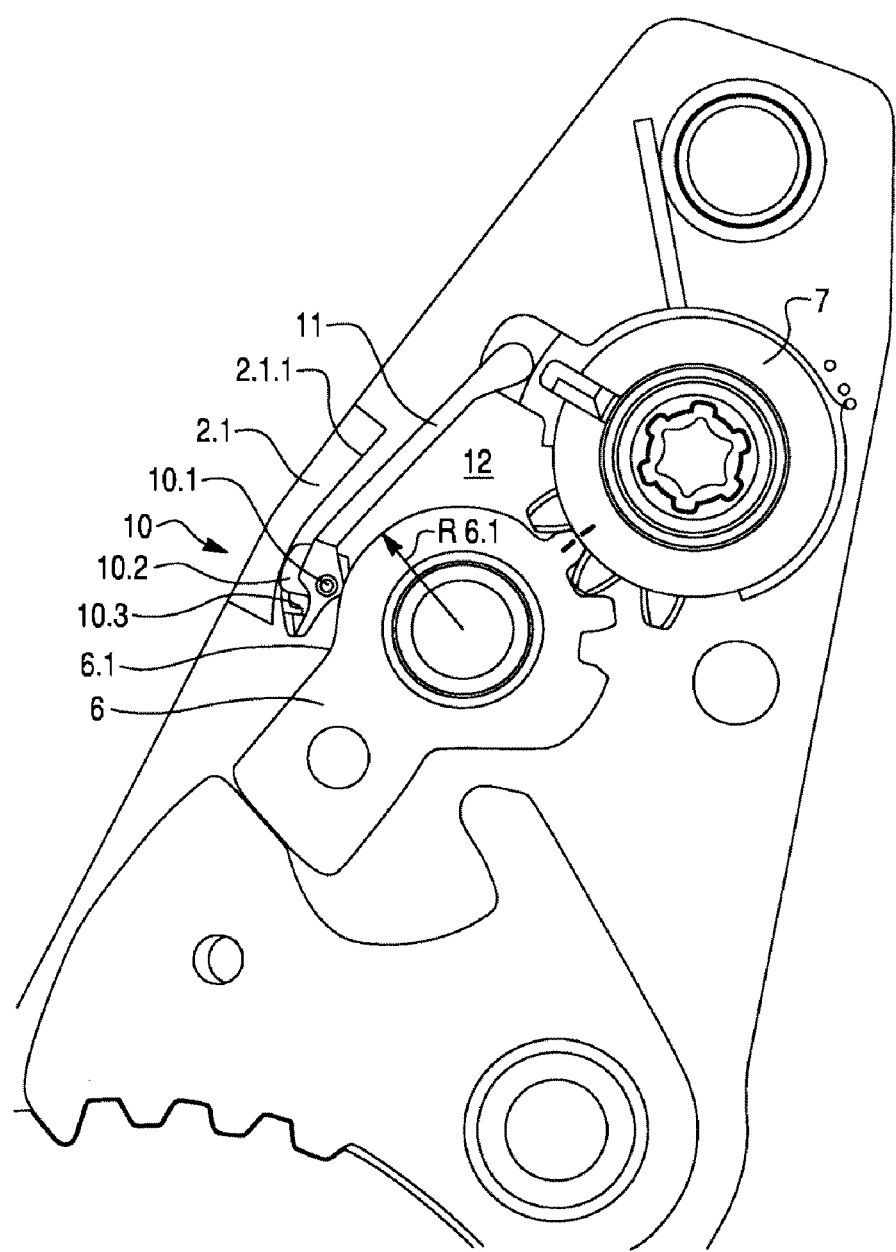
FIG. 15 is a side view of a locking and releasing mechanism according to another exemplary embodiment.
Figure 16:
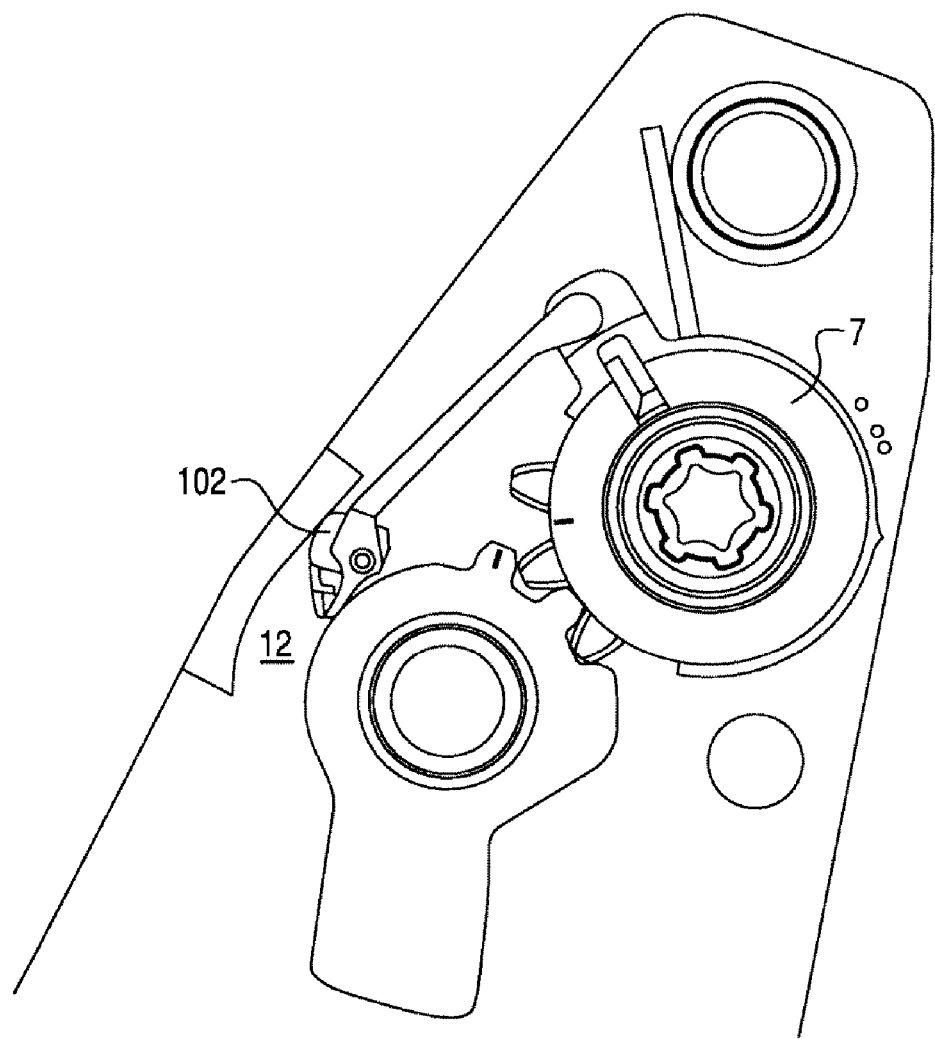
FIG. 16 is a side view of the locking and releasing mechanism of FIG. 15.

FIGS. 15 and 16 show the mechanism 100 according to another exemplary embodiment. The exemplary embodiment shown in FIGS. 15 and 16 is similar to the exemplary embodiment shown in FIGS. 11 through 14, but for which the ball 10 is replaced by a freewheel element 10.2 which may only be rotated counterclockwise about the axis of rotation 10.1 extending in the paper plane. The freewheel element comprises a spring means 10.3 which pretensions the freewheel element in a clockwise direction. Moreover, the connecting means 11 is not designed to be resilient but substantially rigid, but provided on the drive 7 with a rotary joint. Moreover, the contours 6.1 to 2.1.1 are not provided with an increasing contour but with a contour remaining the same and/or decreasing toward the outlet of the gap 12. According to the embodiment illustrated, the freewheel element is positioned by the drive 7 and/or by the connecting means 11 at a point in the gap 12 at which no clearance is present between the freewheel element 10.2 and the contours 6.1 and 2.1.1. The displacement of the freewheel element takes place such that the freewheel element is not blocked. According to an exemplary embodiment, the freewheel element 10.2 may only be rotated counterclockwise in the event of a crash it prevents the rotation of the detent plate 6 clockwise.

FIG. 16 shows the mechanism 100 in the unsecured state. The freewheel element 10.2 has been pulled by the drive 7 onto the upper end of the gap 12, where it no longer acts in a securing manner on the detent plate 6 which thus may also be rotated by the drive 7 counterclockwise, such that the detent plate 6 no longer cooperates in a securing manner with the detent pawl 4. The displacement of the freewheel element has to be carried out so that the freewheel element is not blocked. Relative to the advantages of the mechanism according to FIGS. 15 and 16, with high manufacturing tolerances reference is made to the aforementioned embodiments.

What is claimed is:

1. A seat recliner comprising:
   first and second fitting parts, the second fitting part being selectively displaceable relative to the first fitting part;
   a detent pawl supported at the second fitting part and movable between a first position, wherein the second fitting part is locked relative to the first fitting part, and a second position, wherein the second fitting part is released relative to the first fitting part;
   a detent plate supported at the second fitting part and movable between a detent position for securing the detent pawl in the first position and a release position for allowing the detent pawl to move to the second position;
   a blocking member supported at the second fitting part;
   a securing member arranged between an outer contour of the detent plate and the blocking member; and
   a driver configured to selectively move the detent plate between the detent position and the release position;
   wherein the securing member is a ball.

2. The recliner of claim 1 wherein the securing member is connected to the driver.

3. The recliner of claim 1 wherein a displacement of the detent plate by the driver results in a displacement of the securing member.

4. The recliner of claim 1 wherein clearance is present between the detent plate, blocking member and the securing member.

5. The recliner of claim 1 wherein no clearance is present between the detent plate, blocking member and the securing member.

* * * * *